9110X
J. S. Rockafellow.
Tailor's Measure.
Patented Sept. 18, 1835.
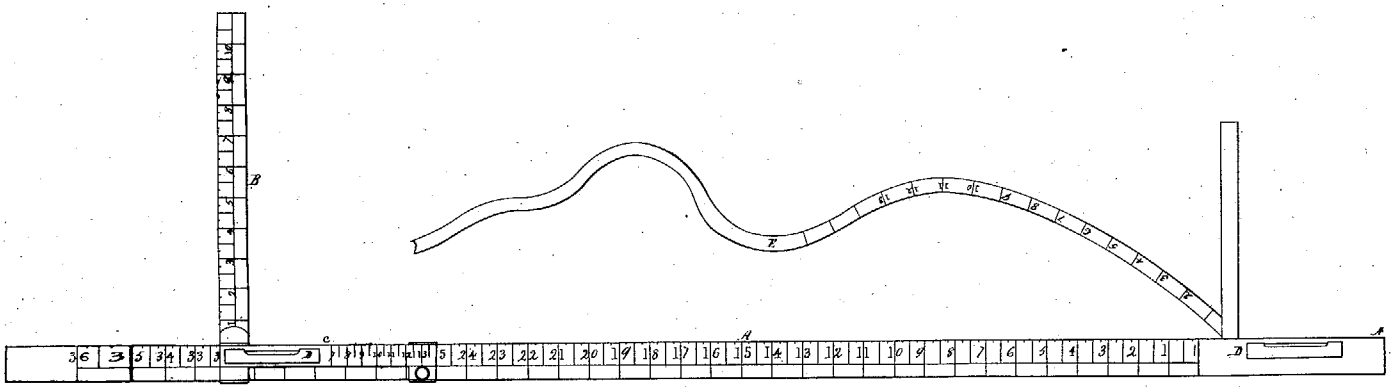

John S. Rockafellow of Flemington, New Jersey -

Letters Patent -

The schedule referred to in these Letters Patent and making part of the same, containing a description in the words of the said John S. Rockafellow, himself of his improvement on Williams, Tailors apparatus for measuring Be it known that I John S. Rockafellow of Flemington Hunt-ington Co. New Jersey, have made an improvement on William's Tailors apparatus for measuring, William's invention consists of an iron or steel strap which has a graduated scale & is in length equal to half the circumference of the human body, near to both ends of this strap are placed spirit levels or glass bulbs, Between these level bulbs is a slide to be moved to the centre of the back, and has affixed thereto a tape or strap about 10 inches long to run up to the socket bone of the neck as well as another tape fastenended to one end of the scale to meet at the same point, my improve-ment consists in having a steel, brass, or wooden strap in length equal to the whole circumference of the body of an ordinary man (and with the exception of about 1/3 its length) graduated to the extreme end & instead of the simple bulb on what is the small end of William's scale I have a slight upright of wood standing on the sliding level and forming a right angle with the same, the object of which is to secure a correct measurement & free from the errors that would arise from the contortions or change of the muscles, in the human body & which errors of measure no measurement of half the size of the body taken separately can guard against, To the slide and bulb is placed a screw to secure them when in a proper point, The tape measure fas-tened to where Williams fastens his is also to be on my scale

9110X the entire length & to meet on the opposite side of the scale instead of reaching only to the middle of the socket of the neck, Operation,
The strap being laid on the body under the arms, the sliding upright is moved up to the front of the arm & the screw tightened the whole length is then to be ascertained, then take half the length and lay the same on the cloth doubled and on the cloth being marked the coat or vest is cut correctly making the necessary deduction for the smaller garment, What I claim as my inven=tion and for which I solicit Letters Patent as an improvement in D. Williams Patent is the construction of a scale equal in length to the entire circumference of the human body and having the tape of an entire length and the moveable slide and upright to secure a correct measurement, for the cutting of garments, Witnesses
Clement T. Coote
S. A. Elliot John S. Rockafellow 500 [illegible]

[illegible]
ChfW.

(Patented 18 September 1835)

(Drawing)